US007158465B2

(12) United States Patent
Eom

(10) Patent No.: US 7,158,465 B2
(45) Date of Patent: Jan. 2, 2007

(54) APPARATUS AND METHOD FOR DETECTING AND CORRECTING RELATIVE ADDRESS ON OPTICAL STORAGE MEDIUM

(75) Inventor: Woo-sik Eom, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 262 days.

(21) Appl. No.: 10/406,600

(22) Filed: Apr. 4, 2003

(65) Prior Publication Data
US 2005/0073933 A1 Apr. 7, 2005

(30) Foreign Application Priority Data
Apr. 6, 2002 (KR) ................ 2002-18801

(51) Int. Cl.
G11B 7/005 (2006.01)
(52) U.S. Cl. .................. 369/59.25; 369/53.35
(58) Field of Classification Search ............ 369/30.11, 369/30.14, 53.29, 53.34, 59.25
See application file for complete search history.

(56) References Cited

U.S. PATENT DOCUMENTS

| 5,264,970 | A | 11/1993 | Tsia et al. | |
| 6,243,331 | B1* | 6/2001 | Sakamoto et al. | 369/30.11 |
| 6,341,109 | B1* | 1/2002 | Kayanuma | 369/47.14 |
| 2002/0041541 | A1* | 4/2002 | Tsukada et al. | 369/30.11 |
| 2002/0172103 | A1* | 11/2002 | Yamawaki | 369/30.11 |

FOREIGN PATENT DOCUMENTS

| CN | 1210609 | 3/1999 |
| EP | 886275 | 3/1999 |
| JP | 05-020804 | 1/1993 |
| JP | 06-195875 | 7/1994 |
| JP | 11-353817 | 12/1999 |
| JP | 2001-148153 | 5/2001 |
| JP | 2001-176069 | 6/2001 |

OTHER PUBLICATIONS

Chinese Office Action dated Sep. 3, 2004.
Janpanese Office Action issued on Feb. 28,2006, In Japanese Patent Application No. 2003-80764 which corresponds to U.S. Appl. No. 10/406,600.

* cited by examiner

Primary Examiner—Wayne Young
Assistant Examiner—Van T. Pham
(74) Attorney, Agent, or Firm—Staas & Halsey LLP

(57) ABSTRACT

An apparatus for detecting and correcting a relative address on an optical storage medium, includes a relative address detector which reads relative addresses recorded on the optical storage medium, a relative address continuity detector which checks whether the number of continuances between the relative addresses output from the relative address detector is at least a predetermined number N, and a relative address corrector which forcibly corrects a current relative address that is not consecutive to a previous relative address and outputs the corrected relative address, after the relative address continuity detector determines that the number of continuances between the relative addresses is at least the predetermined number N.

24 Claims, 4 Drawing Sheets

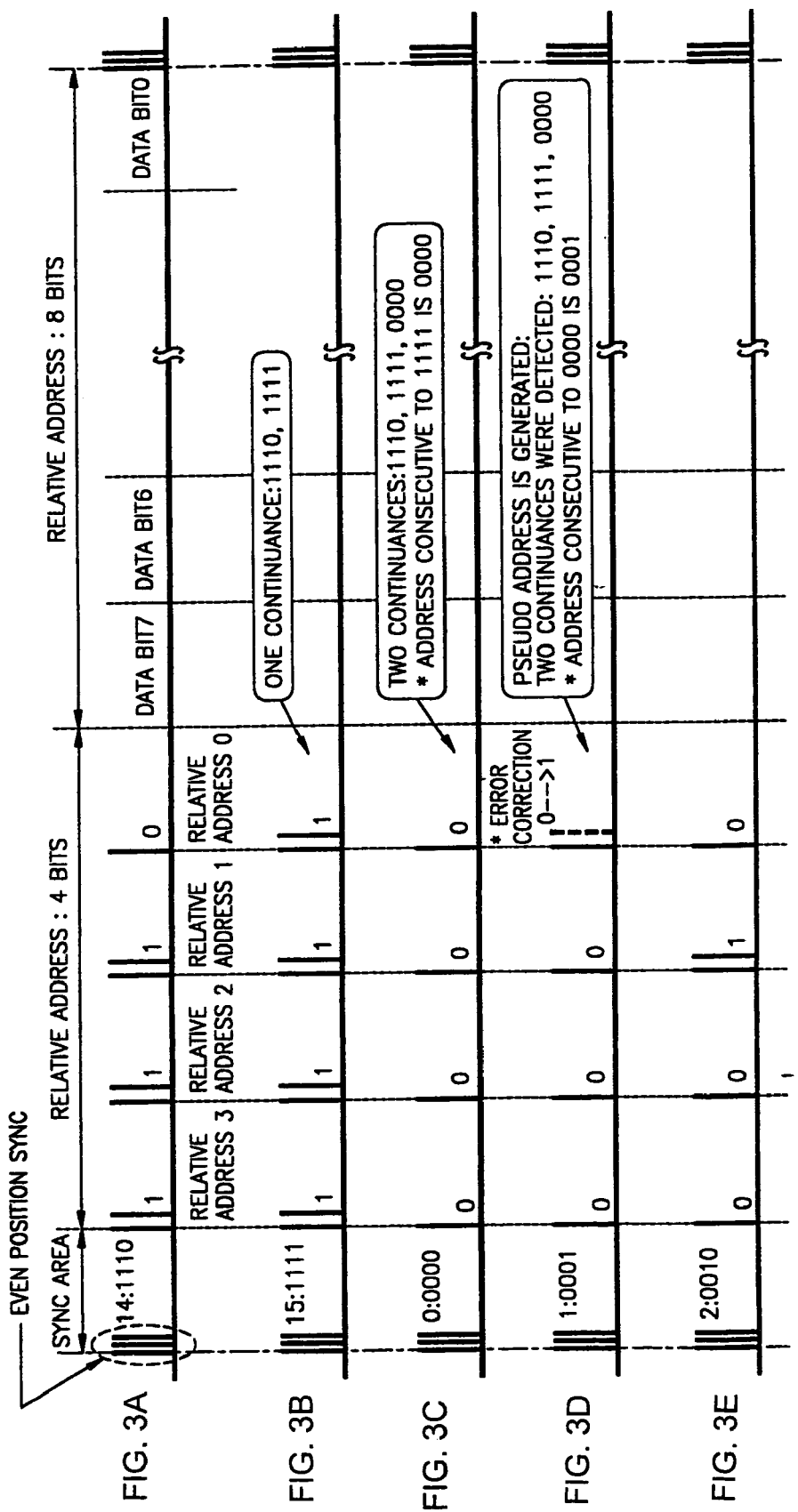

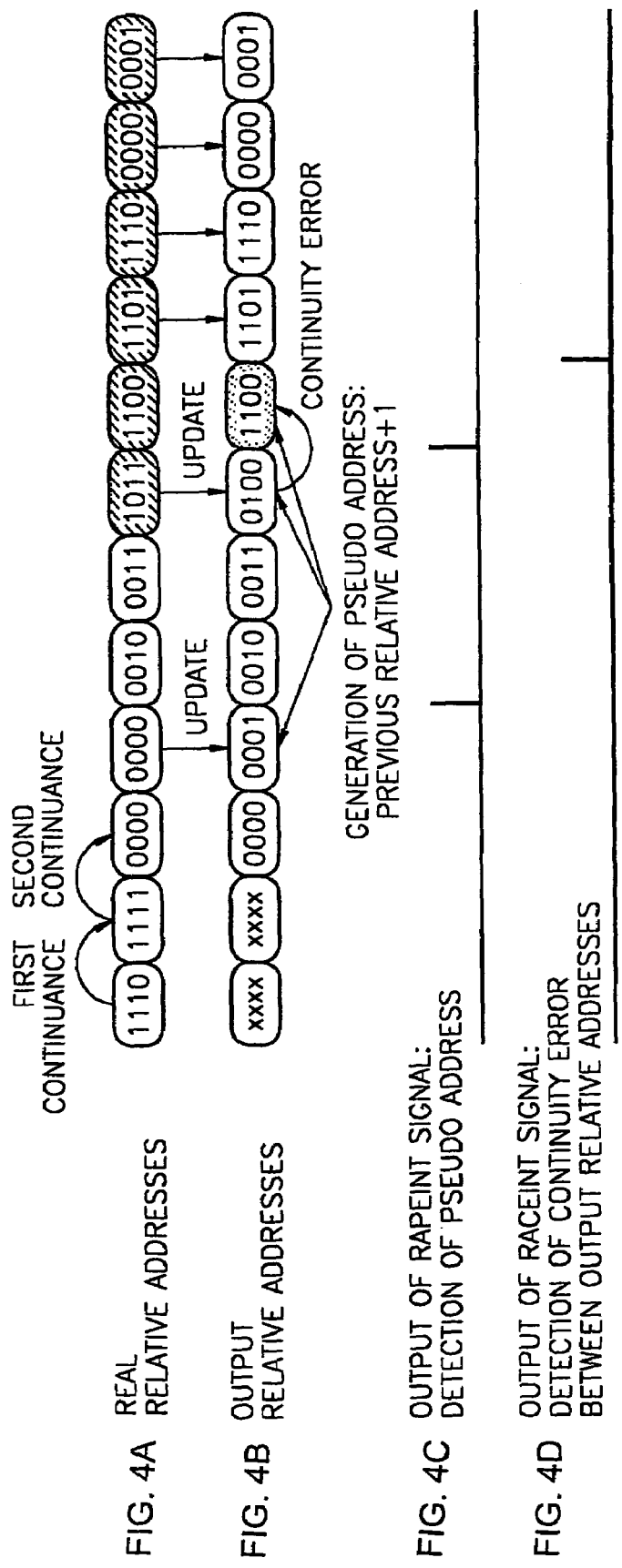

APPARATUS AND METHOD FOR DETECTING AND CORRECTING RELATIVE ADDRESS ON OPTICAL STORAGE MEDIUM

CROSS-REFERENCE TO RELATED APPLICATIONS

This application claims the benefit of Korean Patent Application No. 2002-18801, filed on Apr. 6, 2002, the disclosure of which is incorporated herein by reference.

BACKGROUND OF THE INVENTION

1. Field of the Invention

The present invention relates to a detection of a relative address on an optical storage medium, and more particularly, to an apparatus and method of detecting a relative address, for example, relative position information, recorded in a land pre-pit block of an optical storage medium and correcting an error in the relative address.

2. Description of the Related Art

An optical storage medium, such as a DVD-R or DVD-RW, includes a land pre-pit (LPP) formed by embossing a series of microscopic pits, including address information, in a land during a manufacturing of the optical storage medium. An LPP signal is detected as a light beam follows a track of the optical storage medium. A recording apparatus measures the LPP signal using an optical pickup before and after a recording operation.

An optical storage medium includes an LPP block (i.e., a pre-recorded block) composed of 16 LPP sectors (i.e., pre-recorded sectors). The LPP block is referred to as a "pre-recorded data block" or "pre-recorded physical block" according to a signal processing stage.

The pre-recorded data block includes two data portions A and B. The portion A is composed of a 3-byte error correction code (ECC) block address and a 3-byte parity. In other words, the portion A is composed of 6 pre-recorded data sectors. The portion B is composed of a 1-byte ID field, a 6-byte disc information, and a 3-byte parity. In other words, the portion B is composed of 10 pre-recorded data sectors.

The pre-recorded data block is composed of 16 pre-recorded physical sectors including the portion A, the portion B, and relative addresses of 0000b through 1111b. The pre-recorded physical block is formed by adding a pre-recorded sync to the pre-recorded data block.

A relative address included in an LPP sector is 4 bits in length and indicates a position of the LPP sector among 16 LPP sectors (i.e., 1 LPP block). The relative addresses 0000b through 1111b respectively indicate a first LPP sector through a last LPP sector. A relative address number is the same as the lower 4 bits of a physical sector number recorded in a groove. A relative address does not have an ECC or an error detection code (EDC).

Where a relative address in an LPP block is incorrectly detected while information is recorded on or reproduced from an optical storage medium, a decoding error occurs even if other data in the LPP block is correctly detected.

Therefore, an apparatus and method of correcting an error, during a detecting of a relative address that does not have an EDC or ECC, is desired.

SUMMARY OF THE INVENTION

Accordingly, is it an aspect of the present invention to provide an apparatus and method of detecting a relative address on an optical storage medium and correcting an error in the relative address so as to reduce errors during a detection of a land pre-pit (LPP) from the optical storage medium.

Additional aspects and advantages of the invention will be set forth in part in the description which follows and, in part, will be obvious from the description, or may be learned by practice of the invention.

To achieve the above and/or other aspects of the present invention, there is provided an apparatus for detecting and correcting a relative address of an optical storage medium, comprising a relative address detector which detects relative addresses recorded on the optical storage medium, a relative address continuity detector which determines whether a number of continuances between the relative addresses output from the relative address detector is at least a predetermined number N, and a relative address corrector which corrects a current relative address of the optical storage medium that is not consecutive to a previous one of the relative addresses and outputs the corrected relative address, after the relative address continuity detector determines that the number of continuances between relative addresses is at least the predetermined number N.

The relative address detector may include a window generator, which after a sector sync is detected from the optical storage medium, generates a window signal and detects a signal indicating an area from which a corresponding one of the relative addresses is to be detected.

The predetermined number of continuances N may occur where at least N consecutive relative addresses of the relative addresses, which are each greater than the previous one by 1, are detected.

The relative address corrector may output an interrupt signal indicating that an address error correction has been performed after correcting the current relative address.

The relative address corrector may output a second interrupt signal indicating a continuity error in response to a next relative address detected through the relative address detector immediately after the address error correction, not being consecutive to the corrected relative address.

To achieve the above and/or other aspects of the present invention, there is provided a recording and/or reproducing apparatus for an optical storage medium, comprising a relative address detector which detects relative addresses recorded on the optical storage medium, a user data detector which detects land pre-pit (LPP) user data recorded on the optical storage medium a relative address continuity detector which determines whether a number of continuances between the relative addresses output from the relative address detector is at least a predetermined number N, a relative address corrector which corrects a current relative address of the optical storage medium that is not consecutive to a previous one of the relative addresses and outputs the corrected relative address, after the relative address continuity detector determines that the number of continuances between the relative addresses is at least the predetermined number N, and an LPP decoder which decodes the LPP user data after an address error correction of the relative address corrector.

The relative address detector may include a window generator, which after a sector sync is detected from the optical storage medium, generates a window signal and detects a signal indicating an area from which a corresponding one of the relative addresses is to be detected.

The predetermined number of continuances N may occur where at least N consecutive relative addresses of the relative addresses, which are each greater than the previous one by 1, are detected.

The relative address corrector may output an interrupt signal indicating that an address error correction has been performed after correcting the current relative address.

The relative address corrector may output a second interrupt signal indicating a continuity error in response to a next relative address detected through the relative address detector immediately after the address error correction, not being consecutive to the corrected relative address.

To achieve the above and/or other aspects of the present invention, there is provided a method of detecting and correcting a relative address of an optical storage medium, the method comprising detecting relative addresses recorded on the optical storage medium, determining whether a number of continuances between the detected relative addresses is at least a predetermined number N, and correcting and outputting a current relative address of the optical storage medium in response to the current relative address not being consecutive to a previous one of the relative addresses after a determination that the number of continuances between the detected relative addresses is at least the predetermined number N.

The detecting of the relative addresses may include generating a window signal and detecting a signal indicating an area from which a corresponding one of the relative addresses is to be detected, after a sector sync is detected from the optical storage medium.

The predetermined number of continuances N may occur where at least N consecutive relative addresses of the relative addresses, which are each greater than the previous one by 1, are detected.

The method may further include outputting an interrupt signal indicating that an address error correction has been performed after correcting the current relative address.

The method may further include outputting a second interrupt signal indicating an existence of a continuity error in response to a next relative address detected immediately after the address error correction, not being consecutive to the corrected relative address.

BRIEF DESCRIPTION OF THE DRAWINGS

These and/or other aspects and advantages of the present invention will become apparent and more readily appreciated from the following description of the embodiments, taken in conjunction with the accompanying drawings of which:

FIGS. 3A through 3E are diagrams showing examples of LPP data frame structures of respective consecutive sectors on an optical storage medium; and FIGS. 4A through 4D are diagrams showing an example of correcting an address and generating an interrupt signal to a microcomputer.

DETAILED DESCRIPTION OF THE PREFERRED EMBODIMENTS

Figure 1:
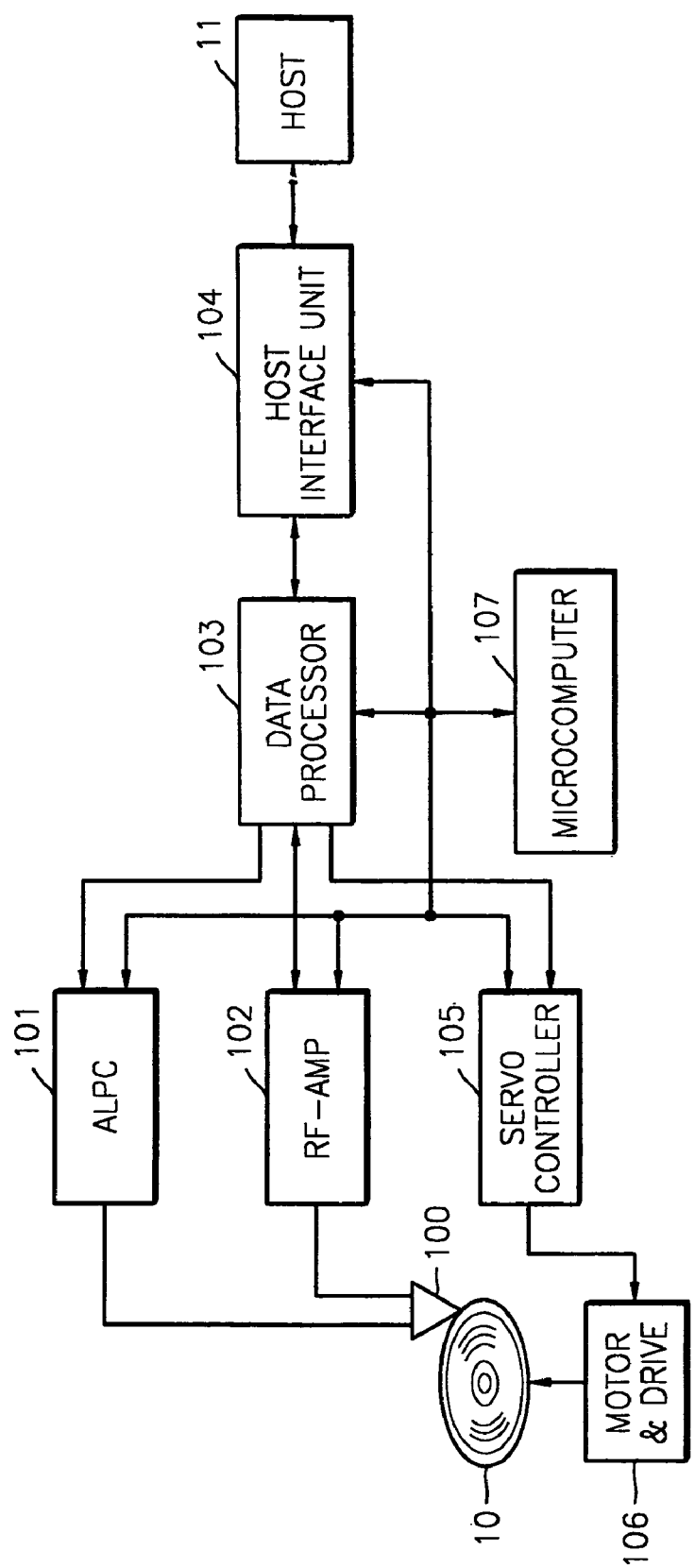
FIG. 1 is a schematic block diagram of a recording and reproducing apparatus for an optical storage medium according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows a schematic block diagram of a recording and reproducing apparatus for an optical storage medium according to an embodiment of the present invention. Referring to FIG. 1, the recording and reproducing apparatus includes a pick-up unit 100, an adaptive laser power controller (ALPC) 101, a radio frequency amplifier (RF-AMP) 102, a data processor 103, a host interface unit 104, a servo controller 105, and a motor & drive 106.

The pick-up unit 100 reads a signal recorded on an optical storage medium 10.

The ALPC 101 receives a write pulse signal, a write clock signal and a write enable signal, and controls the quantity of laser light for a recording so that the pick-up unit 100 can record the write pulse signal in the optical storage medium 10 in a form of a recording mark according to the write clock signal.

The RF-AMP 102 amplifies a minute electric signal output from the pick-up unit 100, detects a reproducing signal and a wobble signal from the amplified electric signal, and provides them to the data processor 103.

The data processor 103 detects a sync signal from the reproducing signal provided from the RF-AMP 102, performs an insertion and protection of data, and performs a modulation and error detection/correction, during a reproducing operation. In addition, the data processor 103 generates various types of control signals and provides a signal related to a servo to the servo controller 105. During a recording operation, the data processor 103 modulates data provided from a host 11 through the host interface unit 104 and performs an error correction coding so as to generate a write pulse signal. The data processor 103 provides the write pulse signal to the ALPC 101.

In the present invention, the data processor 103 includes a circuit which detects a land pre-pit (LPP) relative address, checks whether there is an error in the LPP relative address, and restores an LPP relative address value in response to an error being detected in the LPP relative address. This circuit will be described later in detail with reference to FIG. 2.

The host interface unit 104 performs an interface between the data processor 103 and the host 11.

The servo controller 105 receives a servo-related signal from the data processor 103 and performs servo controls, such as a motor control related to the speed of a rotation of the optical storage medium 10, a tracking, and a focusing.

The motor & drive 106 includes a motor related to the rotation of the optical storage medium 10 and a drive which drives the motor. The motor & drive 106 controls the motor and the drive according to a motor drive signal and a servo drive signal for a servo tracking or a servo focusing operation, which are provided from the servo controller 105.

The recording and reproducing apparatus for an optical storage medium can also include a microcomputer 107, as shown in FIG. 1, which controls the recording and reproducing apparatus, and signal flows of components of the recording and reproducing apparatus.

Figure 2:
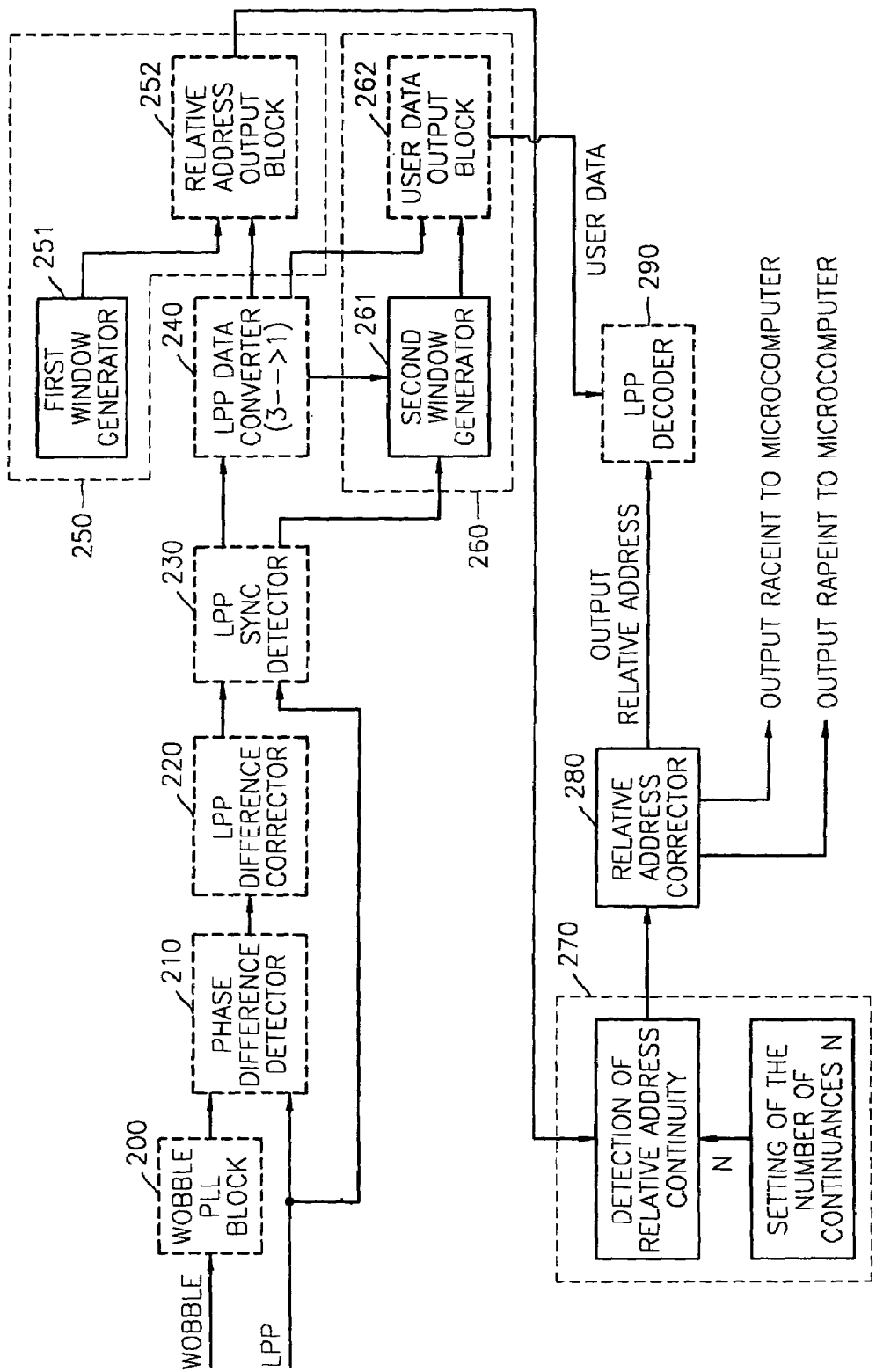
FIG. 2 is a schematic block diagram of a recording and reproducing apparatus for an optical storage medium, having an apparatus which performs a land pre-pit (LPP) data processing, such as a relative address detection and an error correction, according to the present invention.

FIG. 2 shows a schematic block diagram of a recording and reproducing apparatus for an optical storage medium, which performs an LPP data processing, such as a relative address detection and an error correction, according to the present invention. The recording and reproducing apparatus includes a wobble phase-locked loop (PLL) block 200, a phase difference detector 210, a phase difference corrector 220, an LPP sync detector 230, an LPP data converter 240, a relative address detector 250, a user data detector 260, a relative address continuity detector 270, a relative address corrector 280, and an LPP decoder 290.

The wobble PLL block 200 outputs a wobble clock (wbclk) signal, which is an output of a PLL circuit having a wobble signal as an input signal, and a PLL wobble (pwb) signal, which is synchronized with the input wobble signal and follows a mean jitter. For example, a PLL wobble signal is 186 times greater than a wobble clock signal in a DVD-R/RW (that is, a period of the PLL wobble signal is 186 times greater than that of the wobble clock signal) and 32 times greater than a wobble clock signal in a DVD+R/RW. The PLL wobble signal has the same frequency and phase as the original wobble signal. Since a PLL wobble signal is a more reliable signal having less defects and jitter than a wobble signal directly detected in an RF-AMP, the PLL wobble signal, instead of the wobble signal, is used to detect a phase difference with a phase reference signal.

The phase difference detector 210 detects a phase difference between a phase reference signal and a PLL wobble signal using a predetermined method. In a case of a DVD-R or DVD-RW, an LPP signal can be used as the phase reference signal. The phase difference detector 210 may detect the phase difference per wobble clock. The detected phase difference is input to the microcomputer 107 shown in FIG. 1 or directly input to the phase difference corrector 220. Where the phase difference is input to the microcomputer 107, the microcomputer 107 calculates a phase difference compensation value using the phase difference and provides the phase difference compensation value to the phase difference corrector 220.

The phase difference corrector 220 compensates for the phase difference corresponding to an input value from the microcomputer 107 or the phase difference detector 210 with respect to the PLL wobble signal.

The LPP sync detector 230 detects an LPP sync using the phase difference compensated PLL wobble signal provided from the phase difference corrector 220.

The LPP data converter 230 converts an LPP signal that is input to the LPP data converter 230, immediately after a sync is detected in the LPP sync detector 230, into "1" or "0". This conversion is performed to restore an original signal of "1" or "0" that has been converted into a predetermined signal of 3 bits where data is recorded in an LPP on an optical storage medium.

The relative address detector 250 defines a predetermined area following after the detected LPP sync, as a relative address area, and detects LPP data from the predetermined area as a relative address. For these operations, the relative address detector 250 includes a first window generator 251, which outputs a window to detect a signal indicating an area from which a relative address is to be detected, and further includes a relative address output block 252, which outputs a signal (i.e., of 4 bits) output from the LPP data converter 240 as a relative address signal where the signal output from the LPP data converter 240 is detected within the window generated by the first window generator 251.

The user data detector 260 defines a predetermined area as a relative address area and detects LPP data from the predetermined area as user data. For these operations, the user data detector 260 includes a second window generator 261, which outputs a window to detect a signal indicating an area from which user data is to be detected, and further includes a user data output block 262, which outputs a signal (i.e., of 8 bits) output from the LPP data converter 240 as user data where the signal output from the LPP data converter 240 is detected within the window generated by the second window generator 261.

The relative address continuity detector 270 checks whether relative addresses are consecutively output from the relative address detector 250 as many times as the number of continuances set to N. Relative addresses of each sector, i.e., 0000b, 0001b, . . . , 1110b, and 1111b, which sequentially increase by 1, are expected to be sequentially detected. Accordingly, relative address continuity indicates that each of the values of N relative addresses is greater than the value of a previous relative address by 1. As N increases, it takes more time to update the addresses, and particularly, it is difficult to detect the addresses in a system having many errors. Accordingly, N is set by taking account of the characteristics of a system.

After the relative address continuity detector 270 determines that relative addresses satisfy the continuity set to the number of continuances N, where a current relative address detected by the relative address detector 250 is not consecutive to a previous relative address, the relative address corrector 280 forcibly corrects the value of the current relative address into the value of the previous relative address+1 and outputs the corrected relative address. Where the current relative address is normal, the relative address corrector 280 outputs the current relative address, as is.

The forcibly corrected relative address is referred to as a pseudo address. Where the pseudo address is output, the relative address corrector 280 sends a relative address pseudo error interrupt (RAPEINT) signal, indicating that an address error has been corrected, to the microcomputer 107 shown in FIG. 1. In addition, the relative address corrector 280 checks whether the value of a relative address immediately input after the pseudo address is generated is consecutive to the pseudo address. Where the relative address input after the pseudo address is not consecutive to the pseudo address, the relative address corrector 280 sends a relative address continuity error interrupt (RACEINT) signal to the microcomputer 107 so that the microcomputer 107 monitors an abnormal state. Where the relative address detected after the pseudo address is output, is not consecutive to the pseudo address, a pickup may have erroneously slid from a current track into another track. In this case, the microcomputer 107 controls the recording and reproducing apparatus to perform, for example, a track control.

The LPP decoder 290 combines the relative address output from the relative address corrector 280 and the user data output from the user data output block 260, and decodes data in a current LPP block.

FIGS. 3A through 3E show examples of LPP data frame structures of respective consecutive sectors on an optical storage medium. An LPP data frame in each sector comprises, for example, a sync area, a relative address area, and a user data area.

In a sector shown in FIG. 3A, a relative address 1110b is recorded.

In a sector shown in FIG. 3B, a relative address 1111b is recorded. The relative address 1111b in the sector of FIG. 3B is greater than the relative address 1110b in the sector of FIG. 3A by 1. Accordingly, where the sector of FIG. 3B is consecutive to the sector of FIG. 3A, the relative address in the sector of FIG. 3B is correct, and it can be concluded that one continuance of relative addresses is detected starting from the sector shown in FIG. 3A.

In a sector shown in FIG. 3C, a relative address 0000b is recorded. After a relative address sequentially increases from 0000b to 1111b, a relative address starts again from 0000b in the next sector. Accordingly, where the sector of FIG. 3C is consecutive to the sector of FIG. 3B, the relative address in the sector of FIG. 3C is correct, and it can be concluded that two continuances of relative addresses are detected starting from the sector shown in FIG. 3A.

In a sector shown in FIG. 3D, a relative address 0000b is recorded. Since the relative address 0000b is not greater than the relative address 0000b in the previous sector shown in FIG. 3C by 1, it is not a correct address value. Where the number of continuances N is set to 1 or 2 in the circuit shown in FIG. 2, since two continuances have been detected from the sector of FIG. 3A to the sector of FIG. 3C, the relative address 0000b in the sector of FIG. 3D can be corrected into a pseudo address 0001b, i.e., the previous relative address 0000b+1.

In a sector shown in FIG. 3E, a relative address 0010b is recorded. Since the relative address 0010b is consecutive to the pseudo address 0001b, it is considered as being correct. Where a relative address in the sector of FIG. 3E does not have a consecutive value greater than the pseudo address generated for the sector of FIG. 3D by 1, the relative address corrector 280 shown in FIG. 2 outputs a RAPEINT signal to the microcomputer 107 shown in FIG. 1 so that the microcomputer 107 can retry a track control.

FIGS. 4A through 4D show an example of correcting an address and generating an interrupt signal to the microcomputer 107.

FIG. 4A shows examples of real relative addresses detected from consecutive sectors on an optical storage medium. Real relative addresses in hatched portions are detected where an abnormal situation, for example, a sliding over tracks situation, occurs.

FIG. 4B shows the results of correcting errors in relative addresses after N continuances are detected from the real relative addresses, as shown in FIG. 4A.

FIG. 4C shows a first interrupt signal, i.e., a RAPEINT signal, to inform the microcomputer 107 that a pseudo address has been generated where an abnormal real relative address detected in FIG. 4A is corrected into the pseudo address.

FIG. 4D shows a second interrupt signal, i.e., a RACEINT signal, to inform the microcomputer 107 that an abnormal state, i.e., a continuity error, has occurred, as shown in the shaded portion in FIG. 4B. The second interrupt signal is generated where a relative address, which is immediately input after a pseudo address is generated, is not consecutive to the pseudo address.

The microcomputer 107 that receives the first or second interrupt signal shown in FIG. 4C or 4D can perform a servo control on an optical storage medium, with reflection of the abnormal state.

As described above, according to the present invention, an error correction is performed based on the continuity of relative addresses that identify each sector on an optical storage medium. Accordingly, LPP data can be correctly decoded and data can be recorded in an exact position of the optical storage medium.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An apparatus for an optical storage medium, the apparatus comprising:
    a relative address detector which detects relative addresses that are recorded on the optical storage medium;
    a relative address continuity detector which determines whether a number of continuances between the relative addresses output from the relative address detector is at least a predetermined number N;
    a relative address corrector which corrects a current relative address of the optical storage medium that is not consecutive to a previous one of the relative addresses and outputs the corrected relative address, after the relative address continuity detector determines that the number of continuances between the relative addresses is at least the predetermined number N;
    a wobble phase-locked loop (PLL) unit which outputs a PLL wobble signal of the optical storage medium;
    a phase difference detector which detects a phase difference between a reference signal and the PLL wobble signal;
    a phase difference corrector which compensates for the phase difference with respect to the PLL wobble signal;
    an LPP sync detector which detects a LPP signal of the optical storage medium, and a LPP sync using the phase difference compensated PLL wobble signal; and
    an LPP data converter which converts the LPP signal input after the LPP sync is detected, to an original signal of "1" or "0."

2. The apparatus of claim 1, wherein the relative address detector includes a window generator, which after a sector sync is detected from the optical storage medium, generates a window signal and detects a signal indicating an area from which a corresponding one of the relative addresses is to be detected.

3. The apparatus of claim 1, wherein the predetermined number of continuances N occurs where at least N consecutive relative addresses of the relative addresses, which are each greater than the previous one by 1, are detected.

4. The apparatus of claim 1, wherein the relative address corrector outputs an interrupt signal indicating that an address error correction has been performed after correcting the current relative address.

5. The apparatus of claim 4, wherein the relative address corrector outputs a second interrupt signal indicating a continuity error in response to a next relative address detected through the relative address detector immediately after the address error correction, not being consecutive to the corrected relative address.

6. The apparatus of claim 1, wherein the corrected relative address is a value of the previous relative address +1.

7. A method of detecting and correcting a relative address of an optical storage medium, the method comprising:
    detecting the relative addresses recorded on the optical storage medium;
    determining whether a number of continuances between the detected relative addresses is at least a predetermined number N;
    correcting and outputting a current relative address of the optical storage medium in response to the current relative address not being consecutive to a previous one of the relative addresses after a determination that the number of continuances between the detected relative addresses is at least the predetermined number N,
    outputting a phase-locked loon (PLL) wobble signal;
    detecting a phase difference between a reference signal and the PLL wobble signal;
    correcting the phase difference with respect to the PLL wobble signal;
    detecting a land pre-pit (LPP) signal of the optical storage medium and a LPP sync using the corrected PLL wobble signal; and converting the LPP signal input after the LPP sync is detected, to an original signal of "1" or "0."

8. The method of claim 7, wherein the detecting of the relative addresses includes generating a window signal and detecting a signal indicating an area from which a corresponding one of the relative addresses is to be detected, after a sector sync is detected from the optical storage medium.

9. The method of claim 7, wherein the predetermined number of continuances N occurs where at least N consecutive relative addresses of the relative addresses, which are each greater than the previous one by 1, are detected.

10. The method of claim 7, further comprising outputting an interrupt signal indicating that an address error correction has been performed after correcting the current relative address.

11. The method of claim 10, further comprising outputting a second interrupt signal indicating an existence of a continuity error in response to a next relative address detected immediately after the address error correction, not being consecutive to the corrected relative address.

12. A recording and/or reproducing apparatus for an optical storage medium, comprising:
   a relative address detector which detects relative addresses recorded on the optical storage medium;
   a user data detector which detects land pre-pit (LPP) user data recorded on the optical storage medium;
   a relative address continuity detector which determines whether a number of continuances between the relative addresses output from the relative address detector is at least a predetermined number N;
   a relative address corrector which corrects a current relative address of the optical storage medium that is not consecutive to a previous one of the relative addresses and outputs the corrected relative address, after the relative address continuity detector determines that the number of continuances between the relative addresses is at least the predetermined number N;
   an LPP decoder which decodes the LPP user data after an address error correction of the relative address corrector;
   a wobble phase-locked loop (PLL) unit which outputs a PLL wobble signal of the optical storage medium;
   a phase difference detector which detects a phase difference between a reference signal and the PLL wobble signal;
   a phase difference corrector which compensates for the phase difference with respect to the PLL wobble signal;
   an LPP sync detector which detects a LPP signal of the optical storage medium, and a LPP sync using the phase difference compensated PLL wobble signal; and
   an LPP data converter which converts the LPP signal input after the LPP sync is detected, to an original signal of "1" or "0," wherein the user data detector detects the LPP user data based on a signal output from the LPP data converter.

13. The apparatus of claim 12, wherein the relative address detector includes a window generator, which after a sector sync is detected from the optical storage medium, generates a window signal and detects a signal indicating an area from which a corresponding one of the relative addresses is to be detected.

14. The apparatus of claim 12, wherein the predetermined number of continuances N occurs where at least N consecutive relative addresses of the relative addresses, which are each greater than the previous one by 1, are detected.

15. The apparatus of claim 12, wherein the relative address corrector outputs an interrupt signal indicating that an address error correction has been performed after correcting the current relative address.

16. The apparatus of claim 15, wherein the relative address corrector outputs a second interrupt signal indicating a continuity error in response to a next relative address detected through the relative address detector immediately after the address error correction, not being consecutive to the corrected relative address.

17. The apparatus of claim 12, wherein the user data detector includes:
   a window generator which outputs a window to detect a signal indicating an area from which the LPP user data is to be detected; and
   a user data output unit which outputs the signal from the LPP data converter as the LPP user data in response to the signal output from the LPP data converter being detected within the window generated by the window generator.

18. The apparatus of claim 12, wherein the relative address detector includes:
   a window generator which outputs a window to detect a signal indicating an area from which a corresponding one of the relative addresses is to be detected; and
   a relative address output unit which outputs the signal from the LPP data converter as the relative address in response to the signal output from the LPP data converter being detected within the window generated by the window generator.

19. The apparatus of claim 12, further comprising:
   a pickup unit which emits a laser light to read a signal recorded on the optical storage medium;
   an adoptive laser power controller (ALPC) which controls the laser light of the pickup unit;
   a radio frequency amplifier which amplifies the signal output from the pickup unit;
   a motor and drive unit which drives the optical storage medium;
   a servo controller which performs a servo control with respect to the motor and drive unit; and
   a microcomputer which controls an operation of the recording or reproducing apparatus.

20. The apparatus of claim 16, further comprising a microcomputer which receives the interrupt signal and the second interrupt signal, and controls a servo control operation of the recording and reproducing apparatus according to the signals receives thereto.

21. A recording and/or reproducing apparatus for an optical storage medium, comprising:
   a user data detector which detects land pre-pit (LPP) user data recorded on the optical storage medium;
   a relative address correction circuit, which detects LPP relative addresses recorded on the optical storage medium, and which corrects a current LPP relative address of the optical storage medium if the current LPP relative address is not consecutive to a previous one of the LPP relative addresses, wherein the current LPP relative address is corrected and output if a number of continuances between the LPP relative addresses is at least a predetermined number N;
   an LPP decoder which decodes the LPP user data after an address error correction of the LPP relative address;
   a wobble phase-locked loop (PLL) unit which outputs a PLL wobble signal of the optical storage medium;
   a phase difference detector which detects a chase difference between a reference signal and the PLL wobble signal;

a phase difference corrector which compensates for the phase difference with respect to the PLL wobble signal;

an LPP sync detector which detects a LPP signal of the optical storage medium, and a LPP sync using the phase difference compensated PLL wobble signal; and an LPP data converter which converts the LPP signal input after the LPP sync is detected, to an original signal of "1" or "0," wherein the user data detector detects the LPP user data based on a signal output from the LPP data converter.

22. The apparatus of claim 21, wherein the corrected LPP relative address is a value of the previous LPP relative address +1.

23. The apparatus of claim 21, wherein the predetermined number of continuances N occurs where at least N consecutive LPP relative addresses of the LPP relative addresses, which are each greater than the previous one by 1, are detected.

24. A recording and/or reproducing apparatus for an optical storage medium, comprising:

a detector unit which detects land pre-pit (LPP) user data, and which detects relative addresses recorded on the optical storage medium;

a relative address correction unit which corrects an error in the relative addresses according to a continuity of the relative addresses that identify each sector on the optical storage medium, so as to improve a recording and/or decoding of the LPP user data;

an LPP decoder which decodes the LPP user data after an address error correction of the relative address correction unit;

a wobble phase-locked loon (PLL) unit which outputs a PLL wobble signal of the optical storage medium;

a phase difference detector which detects a phase difference between a reference signal and the PLL wobble signal;

a phase difference corrector which compensates for the phase difference with respect to the PLL wobble signal;

an LPP sync detector which detects a LPP signal of the optical storage medium, and a LPP sync using the phase difference compensated PLL wobble signal; and an LPP data converter which converts the LPP signal input after the LPP sync is detected, to an original signal of "1" or "0," wherein the detector unit detects the LPP user data based on a signal output from the LPP data converter.

* * * * *

UNITED STATES PATENT AND TRADEMARK OFFICE
CERTIFICATE OF CORRECTION

| | |
|---|---|
| PATENT NO. | : 7,158,465 B2 |
| APPLICATION NO. | : 10/406600 |
| DATED | : January 2, 2007 |
| INVENTOR(S) | : Woo-sik Eom |

It is certified that error appears in the above-identified patent and that said Letters Patent is hereby corrected as shown below:

Title Page, Item (56), Column 2 (Other Publications), Line 2, change "Janpanese" to --Japanese--.

Column 8, Line 60, change "loon" to --loop--.

Column 10, Line 65, change "chase" to --phase--.

Column 12, Line 8, change "loon" to --loop--.

Signed and Sealed this

Tenth Day of April, 2007

JON W. DUDAS
*Director of the United States Patent and Trademark Office*